United States Patent [19]

Sciulli et al.

[11] 3,832,491

[45] Aug. 27, 1974

[54] DIGITAL VOICE SWITCH WITH AN ADAPTIVE DIGITALLY-CONTROLLED THRESHOLD

[75] Inventors: Joseph Albert Sciulli, Rockville; Paul Andrew Lutz, Gaithersburg, both of Md.

[73] Assignee: Communications Satellite Corporation, Washington, D.C.

[22] Filed: Feb. 13, 1973

[21] Appl. No.: 331,735

[52] U.S. Cl. .......................... 179/1 VC, 179/15 AS
[51] Int. Cl. .......................................... H04b 15/00
[58] Field of Search ........... 179/1 VC, 15 AS, 1 SA

[56] References Cited

UNITED STATES PATENTS

| | | | |
|---|---|---|---|
| 2,958,733 | 11/1960 | Dickieson | 179/15 AS |
| 3,424,869 | 1/1969 | Anderson | 179/15 AS |
| 3,520,999 | 7/1970 | May | 179/15 AS |
| 3,555,192 | 1/1971 | Hymer | 179/1 VC |
| 3,712,959 | 1/1973 | Fariello | 179/1 VC |

*Primary Examiner*—Kathleen Claffy
*Assistant Examiner*—Jon Bradford Leaheey
*Attorney, Agent, or Firm*—Sughrue, Rothwell, Mion, Zinn & Macpeak

[57] ABSTRACT

A voice switch for connecting voice PCM samples in a channel to an output line, said switch comprising a digital adaptive threshold generating means. The threshold level, against which voice samples are compared, is varied in accordance with the loudness of the talker by comparing the number of times the threshold is exceeded over a given period with a reference number. A variable minimum threshold level is also provided at a level just above the channel noise level.

10 Claims, 6 Drawing Figures

DIGITAL VOICE SWITCH WITH AN ADAPTIVE DIGITALLY-CONTROLLED THRESHOLD

BACKGROUND OF THE INVENTION

The invention is in the field of voice switches and in particular is a variable threshold voice switch for distinguishing between the presence of vocal sounds and noise on a communications channel.

Voice switches are known in the art as devices which distinguish between vocal sounds and noise carried by a communications channel. Devices of this nature have a number of known uses. For example, a communications system may include n voice input channels and m voice output channels, where $m < n$. Voice switches are used to determine when there are vocals sounds on any of the n input channels. Only those channels carrying vocal sounds at any instant are connected to an output channel.

Prior art voice switches compare samples of a signal on a channel with a threshold level. If the signal is above the threshold level it is assumed the signal represents voice, otherwise it is assumed that the signal represents noise. A typical vocal sound results in a signal which has its greatest magnitude near the beginning and tappers off towards the end of the sound. In voice switches, the large magnitude front end portion of the sound is usually detected, and the remainder of the sound is passed through the voice switch by using a hangover time for switch connections or turn on. For example, when speech is detected the voice switch is turned on to pass detected samples of the channel signal. Once turned on the voice switch will remain turned on for a given hangover period to insure passage of all samples of said sound. A hangover time of 150 milliseconds has been considered suitable.

Typically, the voice detector detects speech by detecting a given number of consecutive samples in excess of the threshold value. Detection of four samples in succession has been considered suitable.

Clipping of the front end of a sound would occur if the voice switch passed only those samples occurring during the 150 milliseconds period following detection of four consecutive samples in excess of the threshold. To prevent front end clipping, all samples are delayed in fixed amount after detection before being applied to the output of the voice switch. Consequently, the voice switch detects speech prior to the time the beginning of speech arrives at the point where the voice switch controls passage of the samples to an output terminal. A delay time of 4 milliseconds has been found to be suitable.

A problem with the prior art voice switches is that they often clip much of the speech of low level talkers. The fixed threshold used in this type of switch is usually set at a level to reach a compromise between noise triggering and speech detection. However, the level of speech varies substantially from speaker to speaker. For a speaker whose level is near or below the level of noise, the action of this voice switch will tend to produce excessive speech clipping.

SUMMARY OF THE INVENTION

In accordance with the present invention a voice switch is provided which improves on the prior art voice switches and ameliorates the problem of excessive clipping of low level speakers.

The voice switch of the present invention employs a digitally controlled adaptive threshold setting device. It is known that over a given period of time, e.g., one-half second to one second, during which a speaker is talking, speech samples occupy about 30% to 40% of the total time, the rest being silence or noise. This knowledge of the nature of talker activity is used to vary the threshold level against which the samples are compared. Assuming a talker activity of about 35%, a fixed time period of ½ second, and a sample rate of 8 KHz (conventional Nyquist rate for speech), a theoretically optimum threshold will be exceeded about 1,220 times per given ½ second period. If the number of time exceeds 1,220 the threshold is increased, if the number of times is below 1,220 the threshold is decreased. Maximum and minimum threshold levels are provided to prevent the threshold level from rising too high when there is continuous talking by a loud talker and continuous silence, respectively.

The number 1220 is not critical as will be apparent to anyone of ordinary skill in the art. In the specific embodiment described herein, a dead zone is used around the number 1220. Thus, if the number of times the the threshold is exceeded during the one-half second period equals or exceeds 1620 the threshold is increased. If the number is below or equal to 820, the threshold is lowered.

The minimum threshold level may be fixed just above the noise level. However, an additional and alternate feature of this invention is to provide a variable minimum threshold level.

DETAILED DESCRIPTION OF THE PREFERRED EMBODIMENT

Figure 1A:
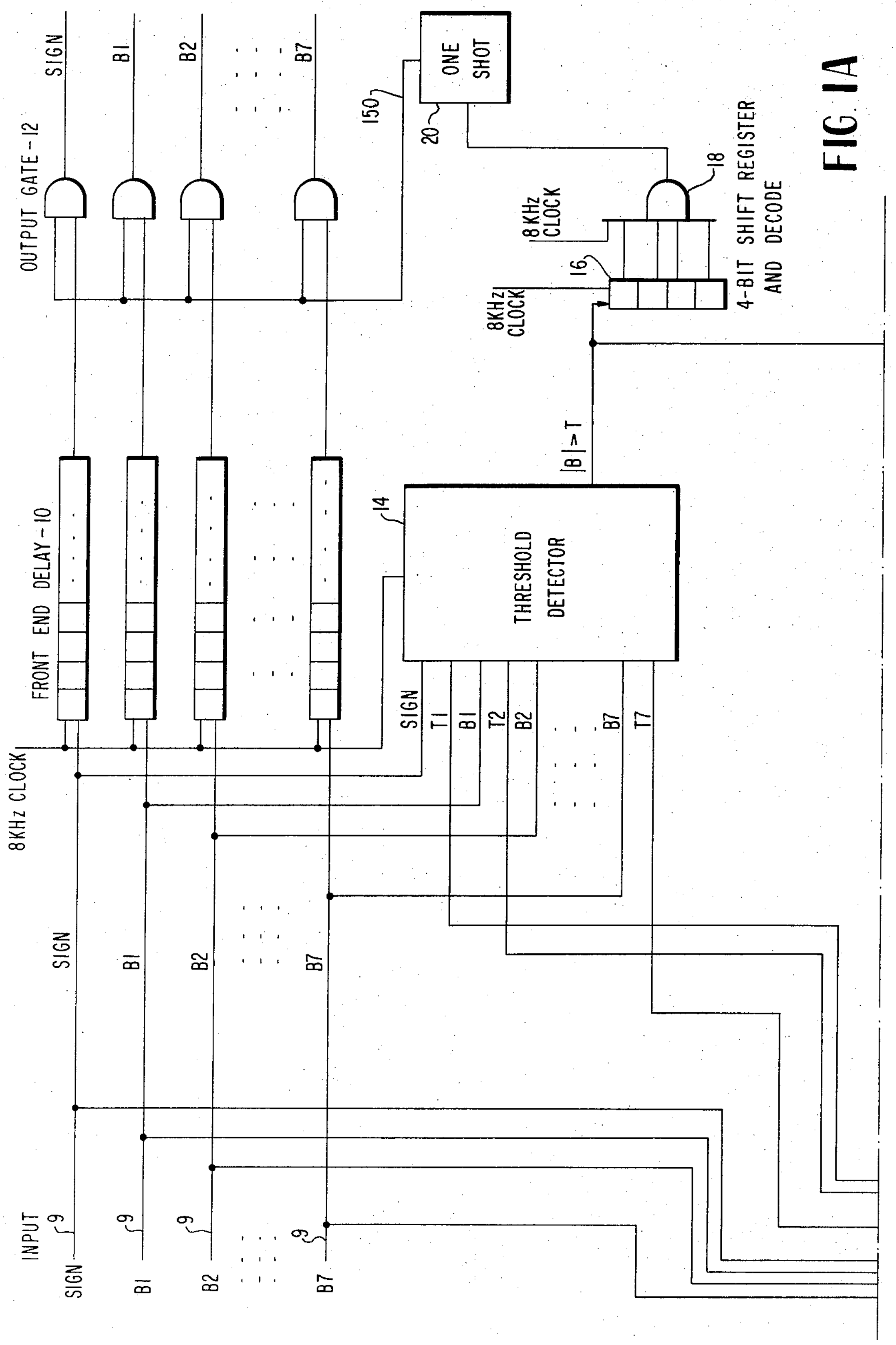
FIG. 1 comprising FIGS. 1A and 1B taken together illustrates in block diagram form a preferred embodiment of the present invention.
Figure 1B:
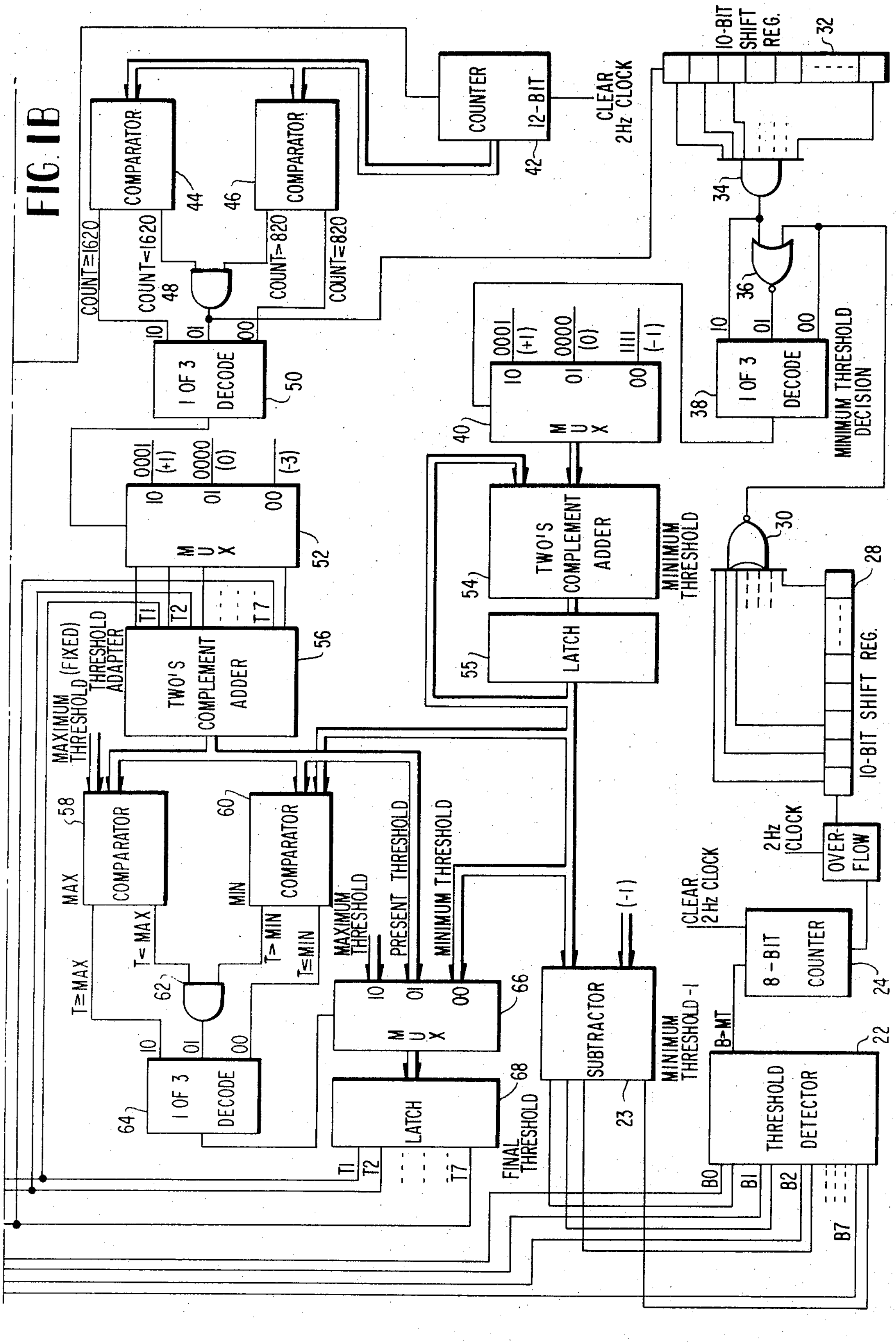

The voice switch of the subject invention operates on PCM samples. As is conventional a digital communications system which transmits voice information in digital format, the analog voice information is applied to a conventiional PCM device and sampled, typically, at an 8 KHz rate each sample being subsequently converted into an 8 bit digital sample. In accordance with the specific embodiment described herein the 8 bit samples comprising 7 bits of magnitude and 1 sign bit are applied to the voice switch. The 8 bits are applied in parallel at input lines 9 as indicated in FIG 1. The negative numbers are in two's complement form as is conventional. For example, the negative number minus 1 would be represented by a binary 1 sign bit and seven binary 1 magnitude bits.

The switching portion of the voice switch comprises front end delay means 10, including a serial shift register for each of the bit positions of the samples, a threshold detector 14, 4 bit shift register 16, AND gate 18, hangover one-shot means 20, and output gates 12. The samples are applied to the input terminals of the several shift registers making up the front end delay means 10. The samples are clocked into the shift registers by an 8 KHz clock. Each of the shift registers of the front end delay means has sufficient stages to provide approximately a 4 millisecond delay for reasons described above. The delayed samples are applied to output gates 12. The output gates are turned on to pass voice samples and turned off to block the passage of non-voice or noise samples. Consequently, an all zero output will appear at the output gates 12 in the absence of speech.

The samples are also applied to a threshold detector 14 along with a digital representation of a threshold level. Since the threshold level will always be positive it is not necessary to provide a sign bit for the digital threshold value. The threshold detector 14 compares the magnitude of the sample with the threshold level and provides a binary 1 output if the magnitude of the sample exceeds the threshold level. Each binary 1 output from threshold detector 14 is clocked by an 8 KHz clock into 4 bit serial shift register 16. If 4 successive samples exceed the threshold level, the shift register 16 will be completely filled with binary 1 bits thereby fully energizing AND gate 18 which passes a binary 1 output to the triggering input of one-shot means 20.

One-shot means 20 is a conventional single shot retriggerable device having a 150 millisecond hangover time. Thus, the output from one-shot 20 will rise to its active level upon triggering and will decay to its nonactive level 150 milliseconds following the last-received trigger. For example, if the one-shot receives two trigger inputs spaced 50 milliseconds apart, it will provide an active output for 200 milliseconds. The active output of one-shot 20 energizes output AND gates 12 to pass the delayed samples to the output terminal.

Figure 2:
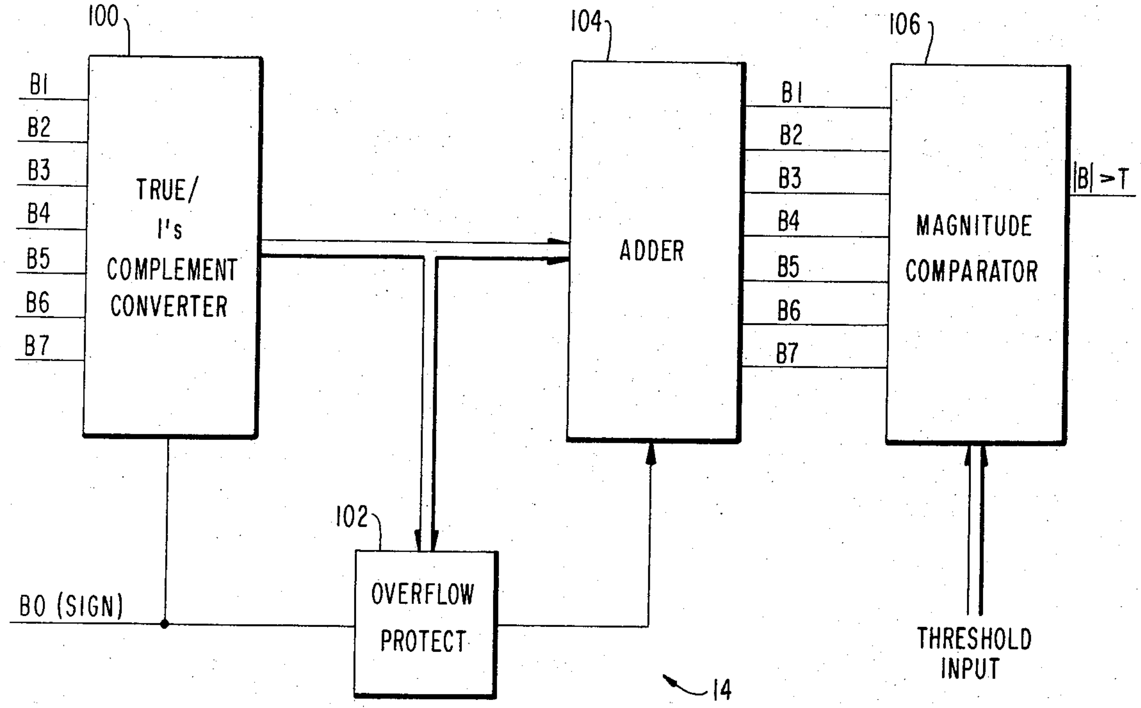
FIG. 2 is a block diagram of a typical binary threshold comparator adapted to compare the magnitudes of positive and negative binary numbers with a threshold value.

One example of a suitable threshold detector 14 is illustrated in FIG. 2 and comprises a true or one complement converter means 100, an overflow protector 102, binary adder means 104, and magnitude comparator 106. The overflow protector 102 is needed because of the nature of binary two's complement information. In general, positive samples are passed directly through the converter 100 and adder 104 and compared in a conventional magnitude comparator with the threshold input. On the other hand negative numbers are converted into their positive equivalents and passed to the magnitude comparator in order to compare the magnitude of the negative sample with the threshold input to the magnitude comparator. Conversion of negative numbers to positive equal magnitude is done by converting the 7 bits of magnitude to their one's complement form and adding a single one bit to the least significant bit position. For example, assume a sample has a value of minus two. This corresponds to the following two's complement binary number;

11111110.

The left most bit is the sign bit and indicates that the number is a negative number. Converting the binary number representing minus two into a positive magnitude of pulse two is done in two steps. First, each bit is inverted to give 7 magnitude bits;

0000001.

This step is referred to as taking the one's complement of the binary number. The next step is to add a single bit to the least significant bit position. This results in the 7 bit number;

0000010.

The above binary number represents a positive number magnitude of plus two.

The only change from the above procedure is that which is required for the maximum negative number. As will be apparent to anyone of ordinary skill in the art, when using two's complement form to represent negative numbers, the maximum negative number which can be written is one greater than the maximum positive number. For example, to simplify the explanation, assume a system having a single sign bit and three magnitude bits. The maximum positive number is plus 7 and is written;

0111.

The zero represents the sign, and the other three bits represent the number 7 in binary form. The maximum negative number is minus 8 and is written in binary form as;

1000.

Because of this one bit difference between maximum negative and maximum positive numbers, a minus 8 number cannot be converted into a plus 8 number, assuming of course the system is limited to one sign bit and three magnitude bits. Consequently, for the special case, in a specific embodiment being described where the negative number represents the maximum magnitude negative number, the sample is converted into the nearest equivalent positive magnitude. Thus, a minus 8 would be converted to a plus 7 magnitude. This is done by taking the one's complemented number, but not adding an additional binary one bit to the least significant position.

Referring back to FIG. 2, the function of the overflow protector 102 is simply to detect when a one bit should be added to the least significant bit of the sample applied to the adder. When the sign bit is zero, signifying a positive value sample, the 7 magnitude bits of the sample are passed directly to the input of the adder. The zero value of the sign bit is also detected by overflow protector 102 which provides a zero output bit. Consequently, in this case nothing is added to the 7 magnitude bits and they appear unaltered at the output of adder 104.

If the sign bit is a 1, signifying a negative valued sample, all 7 bits of the sample are inverted resulting in the one's complement of the sample appearing at the input to adder 104. The one's complement of the seven bits is also applied to the overflow protector 102. If the overflow protector 102 detects a negative sign bit (sign is a 1 bit) and also detects that the sample is not the maximum negative value (the output from converter 100 is not seven 1 bits) the overflow protector 102 will provide a binary 1 output which is added to the least significant bit position of the 7 bit input to adder 104. The resulting output from the adder will be the two's complement of the negative valued sample.

In the special case where the sample is the maximum negative value, the output from converter 100 will be seven binary one's. The combination of 7 binary one's plus a binary 1 sign bit is detected by the overflow protector 102 which provides a zero output. Thus, in this special case there is nothing added to the one's complement of the sample. The overflow protector 102 may be a simple combination of a few NOR gates which provide a binary 1 output only when the sign bit is a binary 1 and the other 7 bits are not all binary one's.

Referring back to FIG. 1, the portion of the voice switch described thus far is conventional. The improvement provided by the subject invention is in the apparatus for generating the threshold level. In the prior art the threshold level was a fixed value whereas in accordance with the present invention the threshold level is adaptive and varies almost continuously throughout operation. The threshold value is held in a latch 68 an is altered or at least checked each half-second as will appear more fully hereafter. The selection of a half-second as the given time period is not critical. However, it appears to be a good selection for counting the number of times which the threshold is exceeded by the samples.

Each time a sample exceeds the threshold level, a binary 1 output from threshold detector 14 is applied to the input terminal of counter 42. Counter 42 is a 12 bit counter which accumulates the input pulses and is reset to zero value every ½ second by a 2 Hz clock. The stages of counter 42 are connected to comparators 44 and 46. Comparators 44 and 46 are conventional devices which compare the state of the counter with preset numbers. In the specific example described comparator 44 compares the state of the counter with a fixed count of 1620. Comparator 46 compares the state of the counter with a fixed count of 820. Although not shown, the comparators 44 and 46 are activated or gated on by the same 2 Hz clock which resets counter 42. However, as will be apparent to anyone of ordinary skill in the art the 2 Hz clock is delayed slightly after activating comparators 44 and 46 before resetting counter 42. If, during a half-second counter 42 counts up to 1620 or above, comparator 44 will provide an output binary 1 which is connected to the upper input terminal of decoder 50. If the counter has a count which is equal to or less than 820 at the time comparator 46 is activated, comparator 46 will provide a binary 1 output which is connected to the lower input of decoder 50. If, at the time the comparators are activated, the count in counter 42 is below 1620 and above 820, both comparators 44 and 46 will provide binary 1 outputs to the AND gate 48 which in turn provides a binary 1 input to the middle input terminal of decoder 50. As will be apparent, only one of the three inputs to decoder 50 carries a binary bit. If the upper input, carries a binary 1 bit it signifies that the threshold value should be increased. If the lower input terminal of decoder 50 carries a binary 1 bit it indicates that the threshold value should be decreased. If the middle input terminal carries a binary 1 bit the threshold value will be neither increased nor decreased. The output of decoder 50 may be a two bit code representing which of the three input lines carries a binary 1. The two bit code from decoder 50 gates one of the three hard-wired input values through multiplexer 52 for subsequent addition to the present threshold level. The values to be added to the present threshold level are respectively, plus one, zero, and minus three. Each of these values is hard-wired in binary form into the multiplexer 52. The output of decoder 50 gates only one of the three hard-wired binary values through the multiplexer to be subsequentially added to the threshold value.

Decoder means 50 and multiplexer 52 may take many conventional forms. One simple example of elements which are connected to make up the combination of decoder means 50 and multiplexer 52 is illustrated in FIG. 3.

Figure 3:
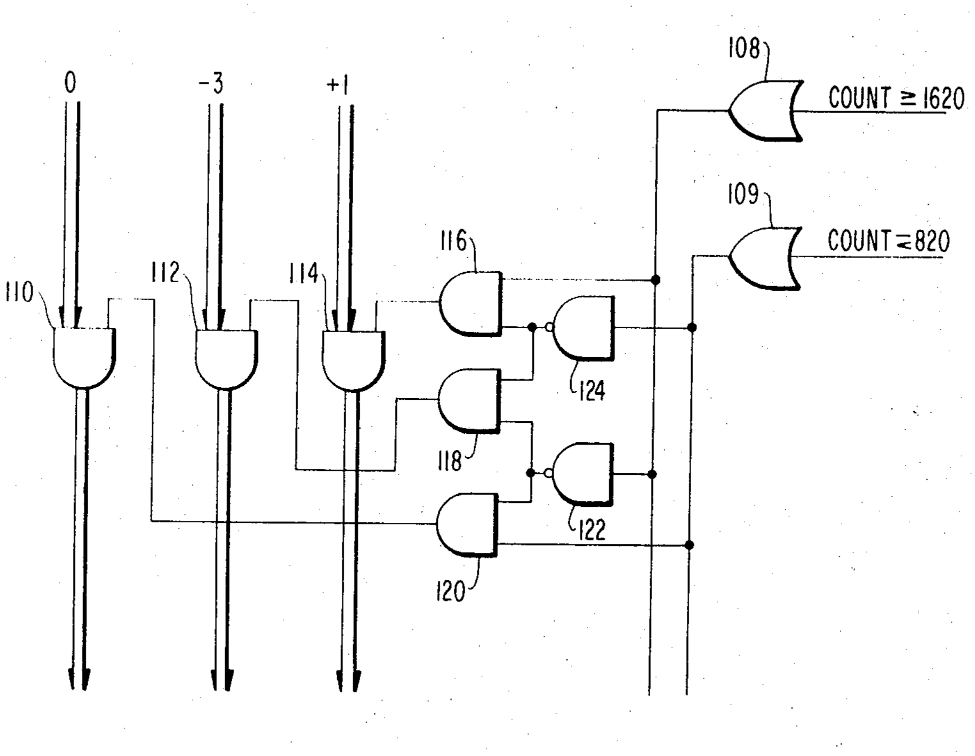
FIG. 3 is a logic diagram of a circuit suitable for use as a decoder and multiplexer combination of FIG. 1.

Referring now to FIG. 3, the binary numbers representing zero, minus three, and plus one, respectively, are applied as inputs to AND gates 110, 112 and 114. The outputs from the latter AND gates represent the output from multiplexer 52. All of the outputs may be applied through an OR gating means not shown. When the count of counter 42 is greater than or equal to 1620, the upper input to decoder 50 carries a binary 1 input. This binary 1 input passes through OR gate 108 and is applied as one input to AND gate 116. The output from OR gate 109 will be a binary 0 and is applied as the input to invert gate 124. The output from invert gate 124, being a binary 1, is applied to AND gate 116 whose output in turn energizes AND gating means 114 to pass the binary number equivalent to plus one to the output of the multiplexer. When the counter 42 contains a count which is less than or equal to 820, the lower input to decode means 50 will carry a binary 1. The latter binary 1 is applied through OR gate 109 to one of the inputs of AND gate 120. The output from OR gate 108 will be binary 0 and will be applied as the input to invert gate 122. The binary 1 output from invert gate 122 will be applied to AND gate 120 whose output, also a binary 1, will activate AND gating means 110 to pass the binary equivalent of zero value to the output of the multiplexer. When the count in counter 42 is between 1620 and 820, the outputs from OR gates 108 and 109 will both be at binary 0. Invert gates 124 and 122 will both receive binary 0 inputs and provide binary 1 outputs. AND gate 118 will be fully energized to activate AND gating means 112 to pass the binary equivalent of the number minus three to the output of the multiplexer 52. Although timing means is not shown it will be apparent that the 2 Hz clock may be additionally applied to the AND gating means 110, 112, 114, after a slight delay, to provide the necessary timing sequence to the operation. In fact, timing throughout the variable threshold means may be controlled by the 2 Hz clock with various slight delays to ensure that the circuitry providing the input pulses to any given means has had time to settle before the clock is applied to said given means.

It will be noted from the previous description of multiplexer 52 that the threshold value is increased by plus one but decreased by minus three. Thus, the rate of decrease of the threshold is more rapid than the rate of increase. This particular feature is included in the system because after a high level talker finishes talking, it is necessary to rapidly reduce the threshold level to accommodate low level talkers who may follow a high level talker. On the other hand, a low level threshold, existing because of low level talkers, need not be increased as rapidly since the low level will accommodate high level talkers.

The output from multiplexer 52 is applied as one of the inputs to a conventional two's complement adder 56. The other input to the adder 56 is the threshold value from latch means 68. The output from the adder represents a new value which will be the new threshold provided it does not exceed a maximum fixed threshold or is not below a minimum threshold. For the present it may be assumed that the maximum threshold is fixed and the minimum threshold is fixed. In one particular embodiment of the invention both the maximum and mimimum thresholds will be fixed. However, in another embodiment of the invention, to be described more fully hereafter, the maximum threshold is fixed but the minimum threshold is varied.

The output of adder 56 is applied to comparators 58 and 60, whose outputs in turn are applied to AND gate 62 and decode means 64. The output of decode means 64 is applied to multiplexer 66. The combination of comparators 58 and 60, AND gate 62, decode means 64, and multiplexer 66 is preferably and may be exactly the same as the combination previously described of comparators 44 and 46, AND gate 48, decoder 50, and multiplexer 52. The only difference is in the value of the inputs applied to the comparators and the multiplexer. As seen from the drawing, comparator 58 has a maximum threshold applied thereto, comparator 60 has a minimum threshold applied thereto, and the three binary number inputs to the multiplexer are, respectively, the maximum threshold value, the present threshold out of adder 56, and the minimum threshold, which may be fixed or varied depending upon the embodiment used. If the output of adder 56 is equal to or greater than the maximum fixed threshold, a binary 1 output from comparator 58 will be applied to the upper input of decode means 64 which provides an output signal that energizes multiplexer 66 to pass the maximum threshold binary value therethrough to the latch means 68. If the output from adder 56 is equal to or less than the minimum threshold level, a binary 1 output from comparator 60 will be applied to the lower input terminal of decode means 64 whose output energizes multiplexer 66 to pass the binary number representing the minimum threshold therethrough to latch means 68. If the output from adder 56 is between the maximum and minimum values, AND gate 62 will be energized to provide a binary 1 input to the middle input terminal of the decode means 64. The output of decode means 64 will energize multiplexer 66 to pass the value out of adder 56 through multiplexer 66 and to latch means 68. Thus, the threshold level stored by latch means 68 will be updated every half-second.

It will be apparent to anyone of ordinary skill in the art that since the threshold level is adaptive it makes no difference what the initial value stored in latch means 68 is when the system is first turned on. It will immediately rise or lower to the adaptive level.

The remainder of the apparatus shown in FIG. 1 operates to vary the minimum threshold level ($T_{min}$). Specifically, the minimum threshold level is maintained at a value which is equivalent to 1 binary level above the noise level. Since the noise level may vary, in order to be accurate it is necessary to vary $T_{min}$. The theory of operation of the adaptive minimum threshold feature is as follows. The minimum threshold should hover just above the noise level. If the minimum threshold is either at or below the noise level it is too low. If it is at this too low position during actual periods of silence, the actual threshold level will move down to the noise level due to the adaptive feature of the actual threshold value described above. During such periods of silence the actual threshold value will hover at the noise level and will not change in value. This "hovering" of the actual threshold value is detected and if it occurs for a fixed period of time it is accepted as an indication that the actual threshold level is in fact at the noise level. Since the minimum threshold level must be equal or less than the actual threshold level, this also indicates that the minimum threshold level is lower than it should be. Consequently, the indication of hovering is used to increase the minimum threshold level until it reaches a level just above the noise level. It will be noted that when the minimum threshold level reaches a level just above the noise level, the actual threshold level will also be just above the noise level or greater depending upon whether there is silence or speech activity. It should be noted that hovering for a significant period of time can be used as a valid indicator of the actual threshold level being at the noise level because the actual threshold level will not hover for a significant period of time except when there is silence. This is due to the nature of speech signals which vary substantially in magnitude.

When the minimum threshold, $T_{min}$, is too high, i.e., higher than one binary bit above the present noise level, this fact is detected by looking for five seconds of silence. Five seconds of silence is not critical. But it is sufficient for a valid check on the minimum threshold level. It will be noted that normal speech patterns and talker activity are such that periods of a minimum of five seconds of silence will occur often enough to provide a valid check in a manner to be described. This portion of the system operates by subtracting a binary 1 from $T_{min}$ to provide a value $T_{min}$ minus 1. If $T_{min}$ is just above the noise level, the value $T_{min}$ minus 1 will be at the noise level. This latter value is used as a threshold for comparison with the samples. If $T_{min}$ minus 1 is at the noise level then even during periods of silence the samples will often exceed the level $T_{min}$ minus 1. However, if $T_{min}$ is more than just above the noise level then $T_{min}$ minus 1 will also be above the noise level. Consequently, during periods of silence the level $T_{min}$ minus 1 will not be exceeded by the level of the samples. When this condition occurs for 5 seconds it provides an indication that $T_{min}$ is too high. This indication is used to lower the minimum threshold level $T_{min}$.

Referring back to FIG. 1, the minimum threshold level $T_{min}$ is stored in latch means 55 which may be identical to latch means 68. As in the case of the initial value in latch means 68, the initial value in latch means 55 is irrelevant. Since the minimum threshold means is adaptive the value in latch 55 will soon reach the desired value just above the noise level. As seen in the drawing the output of latch means 55 is applied as the minimum threshold input to comparator means 60 and multiplexer 66 previously described.

The output of AND gate 48 is applied as an input to a 10 bit shift register 32. The output from gate 48 is shifted into shift register 32 by the 2 Hz clock. As previously described, AND gate 48 will provide a binary 1 output each half-second interval during which the actual threshold level is neither increased nor decreased. If 10 consecutive 1 bits appear at the output of AND gate 48, this is sufficient to indicate that the actual threshold level is hovering at the noise level. When the latter condition occurs 10 bit shift register 32 will be fully loaded with 1 bits causing AND gate 34 to be energized and to provide a binary 1 output to the upper input of decode means 38. Decode means 38 will provide an output to multiplexer 40 causing multiplexer 40 to pass to the adder 54 a binary number corresponding to plus one. The latter binary number will be added in adder 54 to the output of latch means 55. The output of the adder will be inserted into latch 55 as the new $T_{min}$. Thus, whenever the condition of hovering exists the value of $T_{min}$ is increased until the hovering condition disappears. It will be noted that decoder 38 and multiplexer 40 may be identical to decoder 50 and multiplexer 52 and decoder 64 and multiplexer 66. The only difference is in the particular input values supplied to the different decoders and multiplexers.

The value $T_{min}$ in latch 55 is also applied as one of the inputs to binary subtractor 23. The other input to binary subtractor 23 is hardwired input binary value equivalent to minus one. Although the device 23 is referred to as a subtractor because it operates to subtract the value of one from $T_{min}$, the device 23 may in practice be a two's complement adder identical to two's complement adders 56 and 54. The device 23 in practice adds the value minus 1 to the value $T_{min}$ from latch 55. The output of subtractor 23 representing the value $T_{min}$ minus 1 is applied as the binary threshold input to threshold detector means 22. Threshold detector means 22 may be identical to threshold detector 14. The only difference is in the value of the threshold level applied thereto. The other input to threshold detector 22 are the samples on input lines 9. Whenever the magnitude of the sample exceeds $T_{min}$ minus 1, threshold detector 22 provides an output binary 1 to an 8-bit counter 24. Counter 24 is cleared by a 2 Hz clock every half-second. Since counter 24 is only an 8-bit counter it can only count up to a maximum of 511. Consequently, it is accurate to state that counter 24 will be completely filled during every half-second interval when there is speech. It is also accurate to state that during periods of silence counter 24 will be filled unless $T_{min}$ minus 1 is above the noise level.

When counter 24 counts higher than 511 it provides an overflow output to the single bit overflow latch 26. The single bit in latch 26 is gated into a 10 bit shift register 28 each half-second by the 2 Hz clock.

The condition that the system looks for in order to determine that the minimum threshold level is too high, is a condition of all zeros in 10 bit shift register 28. It will be noted that it takes 10 periods of the 2 Hz clock (equivalent to five seconds) to fill the 10 bit shift register. If the minimum threshold level is just above the noise level, as it should be, or lower, the value $T_{min}$ minus 1 will be at or below the noise level. As a consequence even during long periods of silence counter 24 will overflow often enough to prevent all zeros from being entered into shift register 28. However, if $T_{min}$ is too high, $T_{min}$ minus 1 will be above the noise level. Consequently, during long periods of silence, e.g., five second intervals, the counter 24 will not overflow and 10 bit shift register 28 will fill up with all zeros. This all zero condition of shift register 28 causes a binary 1 output from NOR gate 30. The binary 1 output from NOR gate 30 is applied to the lower input of decode means 38 whose output in turn activates multiplexer 40 to connect the binary equivalent of minus one to the adder 54. As a result 1 bit is subtracted from the value in latch 55 thereby lowering the minimum threshold level.

When neither of gates 30 and 34 provides a binary 1 to the decoder 38, there will be a binary 1 output from NOR gate 36. When the latter occurs an output from decoder 38 will activate the multiplexer to provide a zero input to the adder 54. This results in the value $T_{min}$ being unchanged.

Figure 4A:
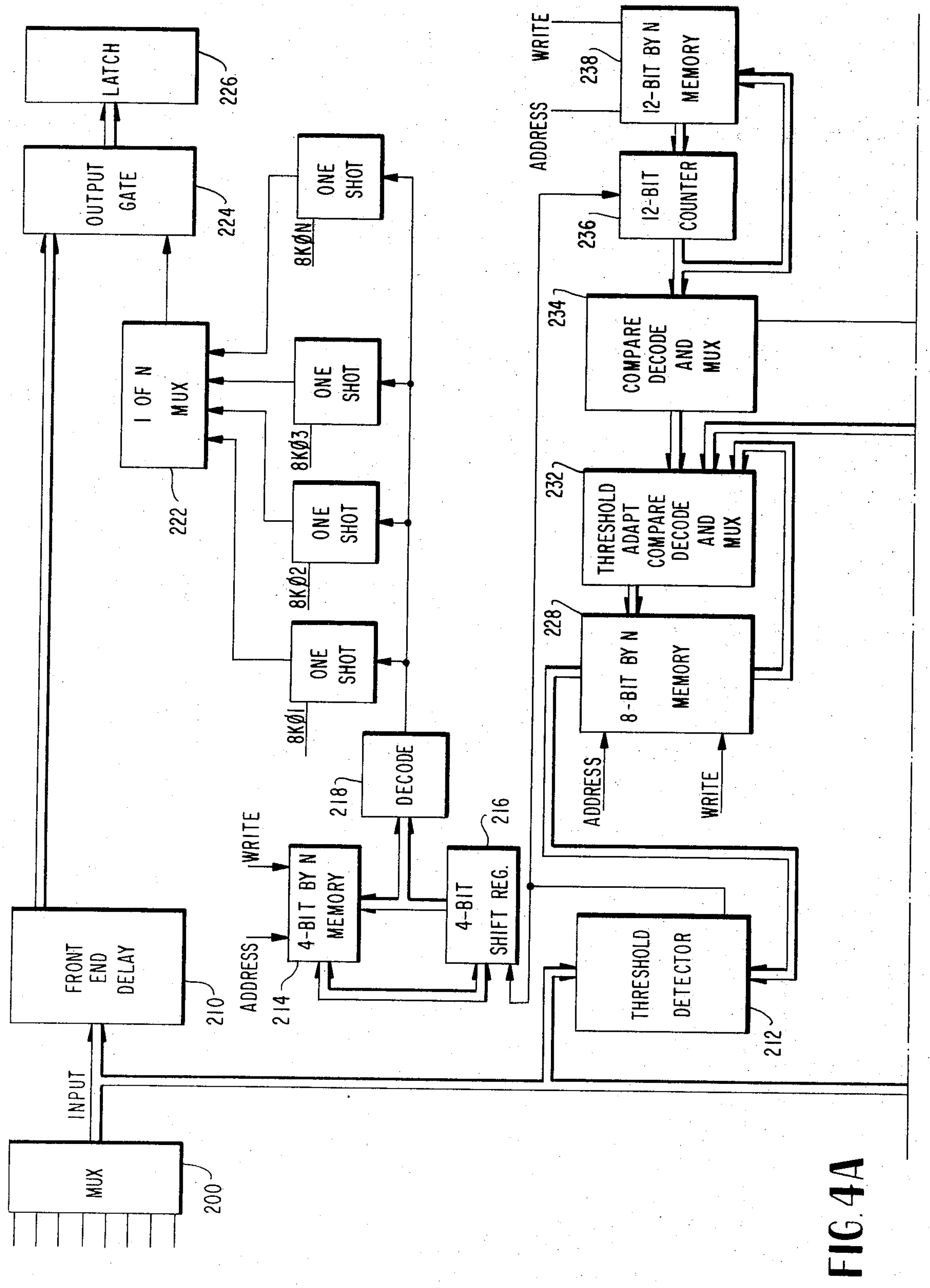
FIG. 4, comprising FIGS. 4A and 4B taken together, is a block diagram of the preferred embodiment of the present invention with the added features needed to operate on multi-channel voice PCM data.
Figure 4B:
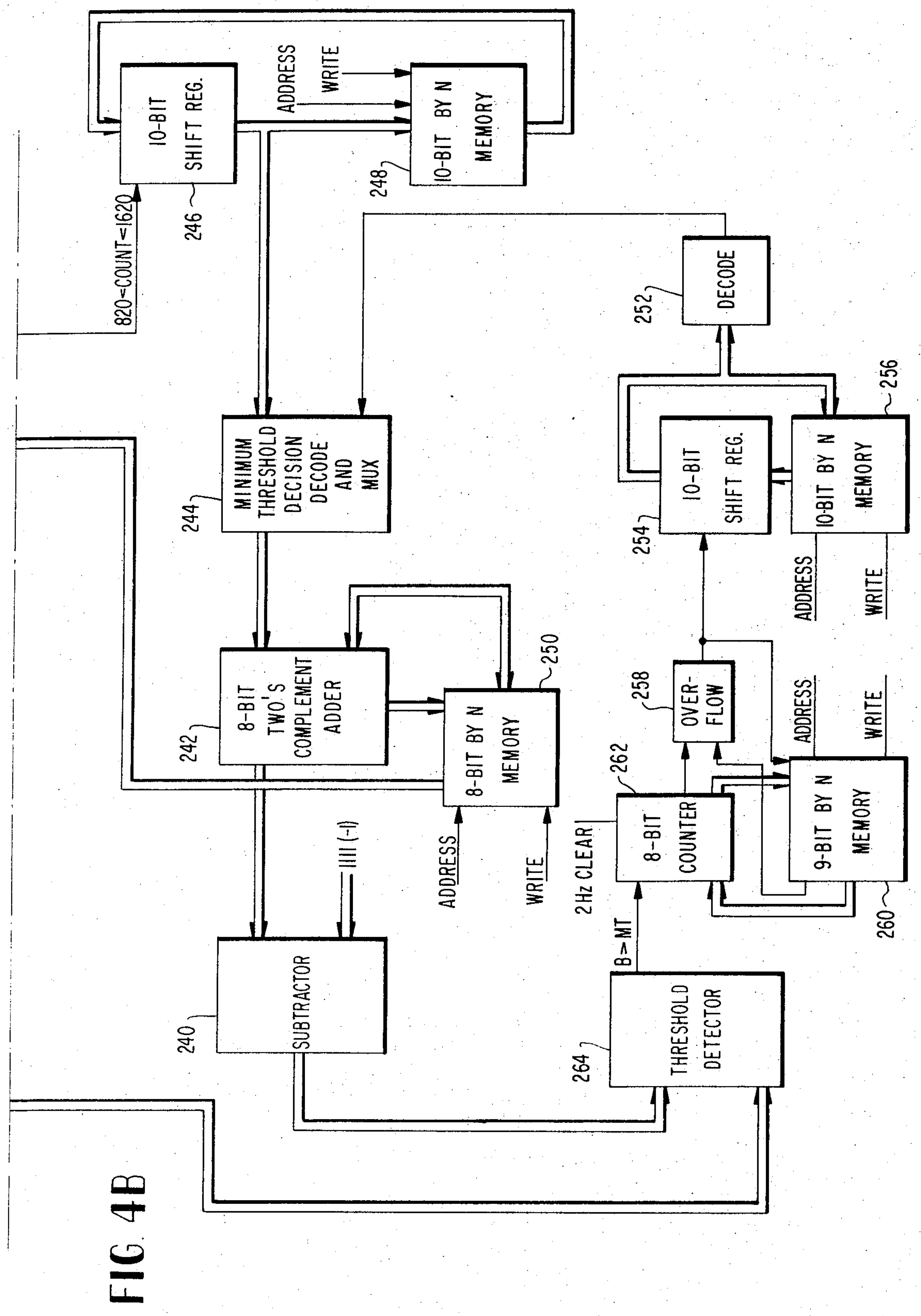

Although the adaptive threshold voice switch has been described above in connection with a single PCM channel of voice data, it will be apparent that the invention described herein can be used with a line carrying multiplexed voice PCM SAMPLES. The techniques described above are suitable for a multiplexed channel, the only difference being in the need for some duplicative circuits, memory means for storing the values held in counters and latches of FIG. 1, and a different timing arrangement to accommodate the multiplexed voice PCM samples. A diagramatic representation of the adaptive threshold voice switch for multplexed voice PCM samples is illustrated in FIG. 4. As indicated, a plurality of voice PCM samples are applied to conventional multiplexer 200. As is conventional voice samples on each input line appear at the 8 KHz rate but they are multiplexed onto the output line at the rate of $n \times 8$ KHz where $n$ is the number of channel inputs to multiplexer 200. Thus, for example if there are 8 input channels supplied to multiplexer 200, voice samples appear at the output at a 64 KHz rate. Timing is provided by a 64 KHz clock which may be derived from the 8 KHz clock indicated in FIG. 1. In other words, each period of the 8 KHz clock is divided into 8 equal segments. Each segment controls the activity of the voice switch in connection with voice samples from a particular input line. The 2 Hz clock referred to in FIG. 1 would be converted into a 16 Hz clock for the same reason. The input samples are applied to front end delay means 210 which is the same as front end delay means 10 shown in FIG. 1 except that front end delay 210 comprises 8 groups of shift registers, one group serving the samples from each of the respective input lines. The delayed samples are applied, respectively, to 8 banks of output gates 224 which have their outputs connected to latch means 226. All 8 banks of output gates 224 may be connected to the same latch means 226. The threshold etector 212 in FIG. 4 corresponds to the threshold detector 14 shown in FIG. 1. However, instead of having a single latch means 68 store a single threshold value and provide that threshold value to the threshold detector, in FIG. 4 a memory 228 stores 8 different threshold values, one for each channel. The memory is controlled by the different phases of the 8 KHz clock to provide the proper threshold value to the threshold detector 212. If the threshold is exceeded threshold detector 212 provides a binary 1 bit to the 4 bit shift register 216 which corresponds to the 4 bit shift register 16. A memory means 214 capable of storing eight different 4 bit sequences operates in conjunction with the 4 bit shift register 26 to provide the proper multiplex operation. In other words, each 4 bit contents of the shift register 216 is written into the memory following each phase of the 8 KHz clock with the last 4 bit sequence in memory 214 being reentered into shift register 216. The decoder 218 corresponds to AND gate 18 of FIG. 1 and provides an output indicating that 4 successive voice samples, from the same voice channel, have exceeded the particular adaptive threshold level pertaining to that particular voice channel. The output of decode means 218 is applied to the inputs of 8 one-shot means 220. However, the only one-shot means which energized is the one which also receives the proper phase input of the 8 KHz clock signal. The particular energized one-shot provides a gating signal which passes through conventional multiplexer 222 and energizes the proper group of output gates 224 to pass the samples to the latch means 226.

Counter means 236 corresponds to the counter 42 in FIG. 1. An 8 address memory 238 cooperates with counter means 236 and is capable of storing eight 12 bit numbers therein. The reading and writing of memory 238 is controlled by the 8 phases of the 8 KHz clock. After each phase of the 8 KHz clock the number presently in the counter is applied back into the memory and the number entered into the memory 8 phases earlier is read out of the memory and entered into the counter. In this manner the counter always contains a count which has relation to the particular channel which originally carried the voice sample presently being tested. The block 234 labelled compare, decode and multiplex, corresponds to the elements 44, 46, 48, 50 and 52 shown in FIG. 1. The latter blocks are shared by all channels in the multiplexing operation. Block 232 which is labelled threshold, adaptive, compare, decode and multiplex, corresponds to adder 56, comparators 58 and 60, AND gate 60, decoder 64 and multiplexer 66 of FIG. 1. The output from block 232, representing the updated threshold value is entered into memory 228 which stores 8 threshold values, one for each voice channel. The threshold values are sequentially read out under control of the 8 phases of the 8 KHz clock and applied to the threshold detector 212 and also as an input to the means 232 wherein it is further updated every half-second as in the case of FIG. 1.

A threshold detector 264 operates in the same manner as threshold detector 22 of FIG. 1. It is the threshold detector for the adaptive minimum threshold value. Eight minimum threshold values are stored in the memory 250 wich performs the same function as latch 55 of FIG. 1. Since there are 8 values therein the memory 250 operates to read out the 8 values in sequence in response to the 8 phases of the 8 KHz clock. The $T_{min}$ values read out of memory 250 are applied to the means 232, to subtractor means 240, and as one input to adder means 242. Adder means 242 corresponds to adder means 54 shown in FIG. 1 and subtractor means 240 corresponds to subtractor means 23 shown in FIG. 1. The output of subtractor means 240 is applied as the $T_{min}$ minus 1 threshold level to the detector 264. The latter value will change each phase of the 8 KHz clock. The 8-bit counter 262 and the overflow latch 258 corresponds to counter 24 and latch 26 shown in FIG. 1.

A 9-bit memory 260 is associated with counter 262 and overflow latch 258 to store the 9 bits from the counter and latch for each of the eight channels. The eight 9-bit words in memory 260 are also entered and read out sequentially in the same manner as described above for all of the other memories. The 10 bit shift register 254 and the decode means 252 corresponds, respectively, to 10 bit shift register 28 and the NOR gate 30 of FIG. 1. A memory 256 is associated with the 10 bit shift register 254. This particular memory is controlled by the eight phases of the 2 Hz clock to sequentially store and read out the 10 bit values stored therein. The 10 bit shift register 246 corresponds to the 10 bit shift register 32 shown in FIG. 1. A memory 248 is associated with the 10 bit shift register and it also is controlled by the eight phases of the 2 Hz clock to sequentially write in and read out 10 bit numbers to and from the 10 bit shift register. The block 244 labelled minimum threshold decision, decode and multiplexer corresponds to NOR gate 36, decoder 38 and multiplexer 40 shown in FIG. 1.

We claim:

1. A voice switch comprising:

a. means for storing a value representing a threshold level, b. threshold detector means for providing an output threshold signal each time a voice sample applied thereto exceeds a threshold level applied thereto, c. means for connecting said value stored in said storing means to said threshold detector means, d. means for connecting periodic samples of a signal on a channel adapted to carry voice signals to said threshold detector, e. accumulator means for accumulating over a predetermined period of time a number representing the number of times said voice samples exceed said threshold value, f. adder means having first and second inputs for adding the values applied to said first and second inputs and providing the sum at an output, said first input being connected to the output of said storing means, g. first comparison means for comparing said accumulated number with a first number and for providing a value representing a positive increment to the second input of said adder means when said accumulated number is greater than said first number, h. second comparison means for comparing said accumulated number with a second number and providing a value representing a negative increment to said second input of said adder means when said accumulated number is less than said second number, and i. means responsive to the output from said adder and to maximum and minimum threshold levels for entering the output sum into said storing means if said output sum is between said maximum and minimum threshold levels.

2. A voice as claimed in claim 1 wherein said voice samples are digitally encoded samples of said signal on a channel adapted to carry voice signals.

3. A voice switch as claimed in claim 1 wherein said negative increment is greater in magnitude than said positive increment.

4. A voice switch as claimed in claim 1 wherein said maximum and minimum threshold values are fixed values.

5. A voice switch as claimed in claim 1 wherein said minimum value is generated by an adaptive minimum threshold level generating means comprising, a. second storage means for storing a value representing said minimum threshold level, and b. means for varying said value in said second storage means to maintain said minimum threshold level at a value a small increment above the noise level in said channel.

6. A voice switch as claimed in claim 5 wherein said means for varying said value in said second storage means comprises, a. a second adder means, having first and second inputs and an output, for providing a sum of the values applied to said first and second inputs at said output, said output being connected to the input of said second storage means, and said first input being connected to the output of said second storage means, b. means connected to said first and second comparison means for detecting a lack of change in said threshold level for a fixed number of said periods, and c. means responsive to the detection by said detection means for applying a value representing a positive increment to the second input of said second adder means.

7. A voice switch as claimed in claim 6 wherein said means for varying said value in said second storage means further comprises, a. means responsive to said minimum threshold level for forming a third threshold level a small incremental amount less than said minimum threshold level, b. second detecting means responsive to said voice samples and said third threshold level for providing a signal output when said third threshold level is above the noise level on said channel for a fixed duration of talker inactivity, said fixed duration being a multiple of said periods, and c. means responsive to said signal output from said detecting means for applying a value representing a small negative increment to the second input of said second adder means.

8. A voice switch as claimed in claim 7 wherein said second detecting means comprises, a. second threshold detector means, connected to receive said voice samples and said third threshold level, for providing an output threshold signal each time any said voice sample exceeds said third threshold level, b. counter means for accumulating said last mentioned output threshold signals over said given period and for providing an overflow output signal during each said given period when the number of said output threshold signals exceeds a predetermined minimum number, said predetermined minimim number being substantially less than the number of said output signals expected during a said given period when said channel carries voice signals, and c. detector means connected to receive said overflow signals for providing an output signal when said detector means fails to receive any overflow signals for a predetermined number of said given periods in succession.

9. A voice switch as claimed in claim 8 wherein said voice samples are digitally encoded samples of said signal on a channel adapted to carry voice signals and all said means are adapted to handle digital signals.

10. A voice switch as claimed in claim 9 wherein said negative increment provided by said second comparison means has a greater magnitude than said positive increment provided by said first comparison means.

* * * * *

UNITED STATES PATENT OFFICE
CERTIFICATE OF CORRECTION

Patent No. 3,832,491 Dated August 27, 1974

Inventor(s) Joseph Albert Sciulli et al

It is certified that error appears in the above-identified patent and that said Letters Patent are hereby corrected as shown below:

In The Specification:

Column 1, line 16, after "are" "vocals" should be -- vocal --

Column 1, line 46, after "delayed" substitute -- a -- for "in"

Column 2, line 23, after "times" delete "the" (first occurrence)

Column 2, line 54, "conventiional" should be -- conventional --

Column 5, line 53, after "binary" insert -- 1 --

Column 7, line 14, after "to" insert -- a --

Column 10, line 18, "multplexed" should be -- multiplexed --

Column 10, line 44, "etector" should be -- detector --

Column 11, line 40, "wich" should be -- which --

Signed and sealed this 17th day of December 1974.

(SEAL)
Attest:

McCOY M. GIBSON JR.
Attesting Officer

C. MARSHALL DANN
Commissioner of Patents

UNITED STATES PATENT OFFICE
CERTIFICATE OF CORRECTION

Patent No. 3,832,491 Dated August 27, 1974

Inventor(s) Joseph Albert SCIULLI and Paul Andrew LUTZ

It is certified that error appears in the above-identified patent and that said Letters Patent are hereby corrected as shown below:

IN THE CLAIMS:

Claim 2, (Col. 12, Line 47) Line 1, after "voice", insert --switch--.

Signed and Sealed this

Sixteenth Day of November 1976

[SEAL]

*Attest:*

RUTH C. MASON
*Attesting Officer*

C. MARSHALL DANN
*Commissioner of Patents and Trademarks*